United States Patent [19]
Nam et al.

[11] Patent Number: 6,138,163
[45] Date of Patent: Oct. 24, 2000

[54] MEDIATE SERVER AND REAL TIME DELIVERY METHOD BETWEEN DIFFERENT NETWORKS

[75] Inventors: Ki-Dong Nam; Hyeun-Tae Lee, both of Daejeon, Rep. of Korea

[73] Assignees: Electronics and Telecommunications Research Institute, Daejeon; Korea Telecom, Seoul, both of Rep. of Korea

[21] Appl. No.: 08/834,401

[22] Filed: Apr. 16, 1997

[30] Foreign Application Priority Data

Nov. 20, 1996 [KR] Rep. of Korea ..................... 96-55820

[51] Int. Cl.[7] ........................................... G06F 9/00
[52] U.S. Cl. ........................ 709/231; 709/219; 709/218; 709/225; 709/203
[58] Field of Search ................... 395/200.49, 200.48, 395/200.61, 200.33; 709/219, 218, 231, 203, 225

[56] References Cited

U.S. PATENT DOCUMENTS

| | | | |
|---|---|---|---|
| 5,461,415 | 10/1995 | Wolf et al. .................................. | 348/7 |
| 5,515,510 | 5/1996 | Kikinis ............................... | 395/200.49 |
| 5,544,327 | 8/1996 | Dan et al. .......................... | 395/200.61 |
| 5,550,982 | 8/1996 | Long et al. ........................ | 395/200.49 |
| 5,583,561 | 12/1996 | Baker et al. ....................... | 395/200.49 |
| 5,586,264 | 12/1996 | Belknap et al. ................... | 395/200.49 |
| 5,644,714 | 7/1997 | Kikinis ............................... | 395/200.49 |
| 5,668,948 | 9/1997 | Belknap et al. ................... | 395/200.61 |
| 5,737,495 | 4/1998 | Adams et al. ..................... | 395/200.49 |
| 5,790,794 | 8/1998 | DuLac et al. ...................... | 395/200.48 |
| 5,808,607 | 9/1998 | Brady et al. ....................... | 395/200.49 |
| 5,809,078 | 9/1998 | Tani et al. ............................... | 375/413 |

*Primary Examiner*—Ahmad F. Matar
*Assistant Examiner*—William D. Thomson
*Attorney, Agent, or Firm*—Jacobson, Price, Holman & Stern, PLLC

[57] ABSTRACT

An improved mediate server and real time delivery method between different networks which is capable of receiving various video services on the low speed Internet in real time after a predetermined time, and by which it is possible to receive various video services based on the service reserving system, which includes a service browser directly connected to a high speed network server for transferring a server address, service type, and selection list by receiving a service browsing request from a user when a selection is received from the user, receiving a result whether a mediate function is needed, and providing a service, a real time controller for transferring a result to the service browser when there is not a mediate function by judging whether the mediate function is needed by receiving a server address, service type, and selection list from the service browser, determining the buffer size after measuring a traffic based on the connection to the server when the mediate function is needed, allocating the buffer, requesting the data to the server, and receiving/transferring the data, and a stream controller for transferring to the user by using the stream protocol when receiving a minimum data from the real time controller.

5 Claims, 6 Drawing Sheets

MEDIATE SERVER AND REAL TIME DELIVERY METHOD BETWEEN DIFFERENT NETWORKS

BACKGROUND OF THE INVENTION

1. Field of the Invention

The present invention relates to a mediate server and real time delivery method between different networks, and particularly, to an improved mediate server and real time delivery method between different networks which are capable of providing a real time video service between different networks having a different network speed by installing a mediate server in a proxy server of a high speed local network or a fire wall.

2. Description of the Conventional Art

There are problems in providing a video information in real time on the Internet. In particular, since the video information requires a fast response time and a wider bandwidth, it is impossible to provide a service in real time. The video service is performed on a conventional low speed Internet network as follows:

A first method is performed by using a guaranteed bandwidth. Namely, this method is directed to reserve a bandwidth and protocol that a video data requires. This method is very useful for installing a network and protocol for a Video On Demand (VOD). However, this method has a problem in that the protocol must be installed in a server and a router, etc. for using the same on the Internet.

A second method is generally used for a conventional Internet service, which downloads all video data into a user memory space and displays a video signal based on the user's system. This method is very easy to implement since the real time processing on the network is not required. However, there are problems in that the user must wait until the downloading is finished, and in the case of a larger video data, there are time delay and memory space limit.

A third method is directed to displaying the video when the receiving video data exceeds a predetermined amount by using a stream protocol. This method uses a self-defined low speed encoding method and a protocol. However, this method has a problem in that it is impossible to guarantee a desired bandwidth for processing data in real time since there is an intermediate node on the Internet.

A fourth method is directed to using an adaptive protocol, which was adapted to a system such as the Vosaic in Illinois university. This method is directed to browsing a data by a user, and preventing a data transfer delay based on a result of the browsing. The result of the browsing is transferred to the server for controlling the transfer speed of the server. In addition, this method is intended for providing the service without changing the conventional router system on the Internet. However, a related protocol and method must be supported by the server.

As described above, it is impossible to provide a better video service without increasing the speed of the network between the user and the server. It is possible to provide the video service in real time since a desired speed is obtained in the high speed local network; however, since it is impossible to install servers related to all video services in the high speed network, the Internet on which it is possible to obtain much information is used. In this case, the proxy server may be used by caching a serviced video data; however, the method is limitative in accordance with the capability of the system and a size of the video data.

SUMMARY OF THE INVENTION

Accordingly, it is an object of the present invention to provide an improved mediate server and real time delivery method between different networks which overcomes the problems encountered in the conventional art.

It is another object of the present invention to provide an improved mediate server and real time delivery method between different networks which are capable of receiving various video services on the low speed Internet in real time after a predetermined time, and by which it is possible to receive various video services based on the service reserving system.

To achieve the above objects, there is provided an improved mediate server between different networks which includes a service browser directly connected to a high speed network server for transferring a server address, service type, and selection list by receiving a service browsing request from a user when a selection is received from the user, receiving a result whether a mediate function is needed, and providing a service, a real time controller for transferring a result to the service browser when there is not a mediate function by judging whether the mediate function is needed by receiving a server address, service type, and selection list from the service browser, determining the buffer size after measuring a traffic based on the connection to the server when the mediate function is needed, allocating the buffer, requesting the data to the server, and receiving/transferring the data, and a stream controller for transferring to the user by using the stream protocol when receiving a minimum data from the real time controller.

To achieve the above objects, there is provided an improved delivery method between different networks which includes the steps of a first step for judging whether a mediate function is needed when a service browsing is requested by a user, and a selection list is received, a second step for providing a real time video service after being connected with a server when the mediate function is not needed as a result of the first step, and a third step for measuring a traffic with the server when the mediate function is needed as a result of the first step, determining the buffer size in accordance with a service dependent bandwidth, measuring traffic, and selection list file size, allocating the buffer, requesting a data to the server, and transferring a data to the user through a stream controller when the data as much as the buffer size is received.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
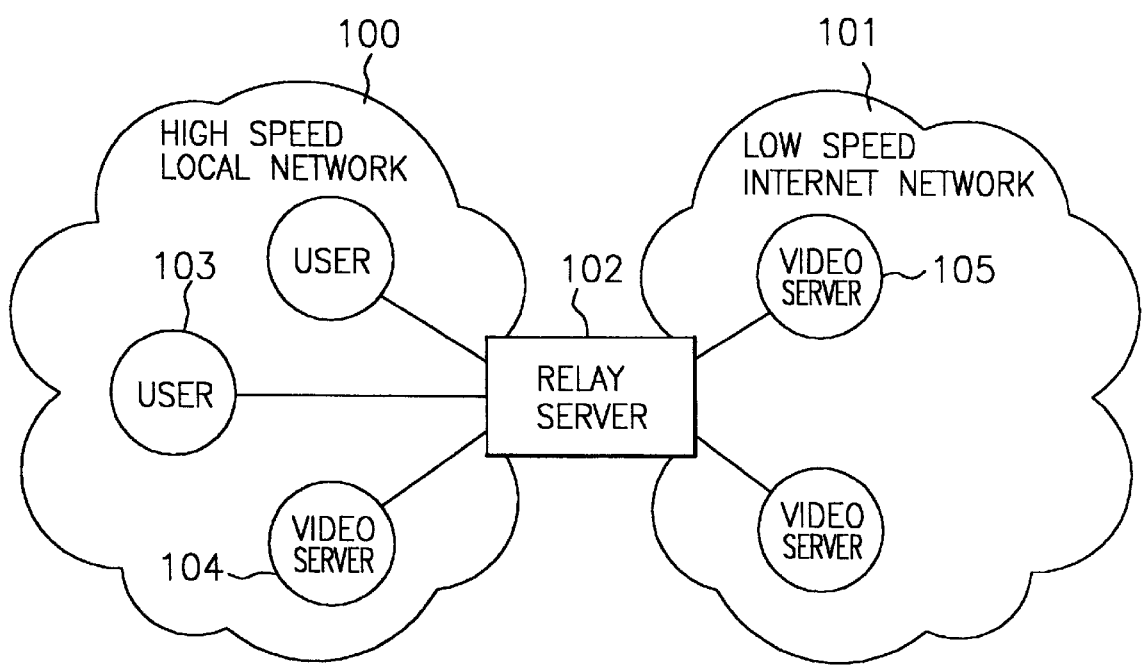
FIG. 1 is a view illustrating a connection between a mediate server and a different network according to the present invention.

FIG. 1 is a view illustrating a connection between a mediate server and a different network according to the present invention.

In the drawings, reference numeral 100 denotes a high speed local network, 101 denotes a low speed Internet network, 102 denotes a mediate server, 103 denotes a high speed local network user, 104 denotes a video server of a high speed local network, and 105 denotes a video server of a low speed Internet.

The high speed local network is an Intranet of more than 10 Mbps (Megabit per second), which relates to an ATM (Asynchronous Transfer Mode) or an Ethernet of 100 Mbps. Since the Ethernet of 10 Mbps shares the bandwidth, and it is impossible to guarantee a predetermined range of bandwidth for the user, it is impossible to provide the user with the video service in real time. In addition, the MPEGII (Moving Picture Expert Group-II) requires the bandwidth of up to 10 Mbps, it is impossible to provide the video service.

The widely used low speed Internet network 101 includes a common public network.

The mediate server 102 according to the present invention is installed in a proxy server location of the high speed local network 100. The proxy server is an HTTP (HuperText Transfer Protocol) server which is operated in the fire wall apparatus, has a function that the user within the fire wall can access an external network, stores a predetermined information by using a caching function in the system, and performs the service when there is a request for the service. The mediate server 102 is provided therein for the reasons that the information from the low speed Internet network 101 is temporally stored. The high speed local network user 103 can receive a real time video service by using the video server 104, and it is possible to use the low speed video server 105 but the mediate server 102 is used since the real time service is not supported therein.

Figure 2:
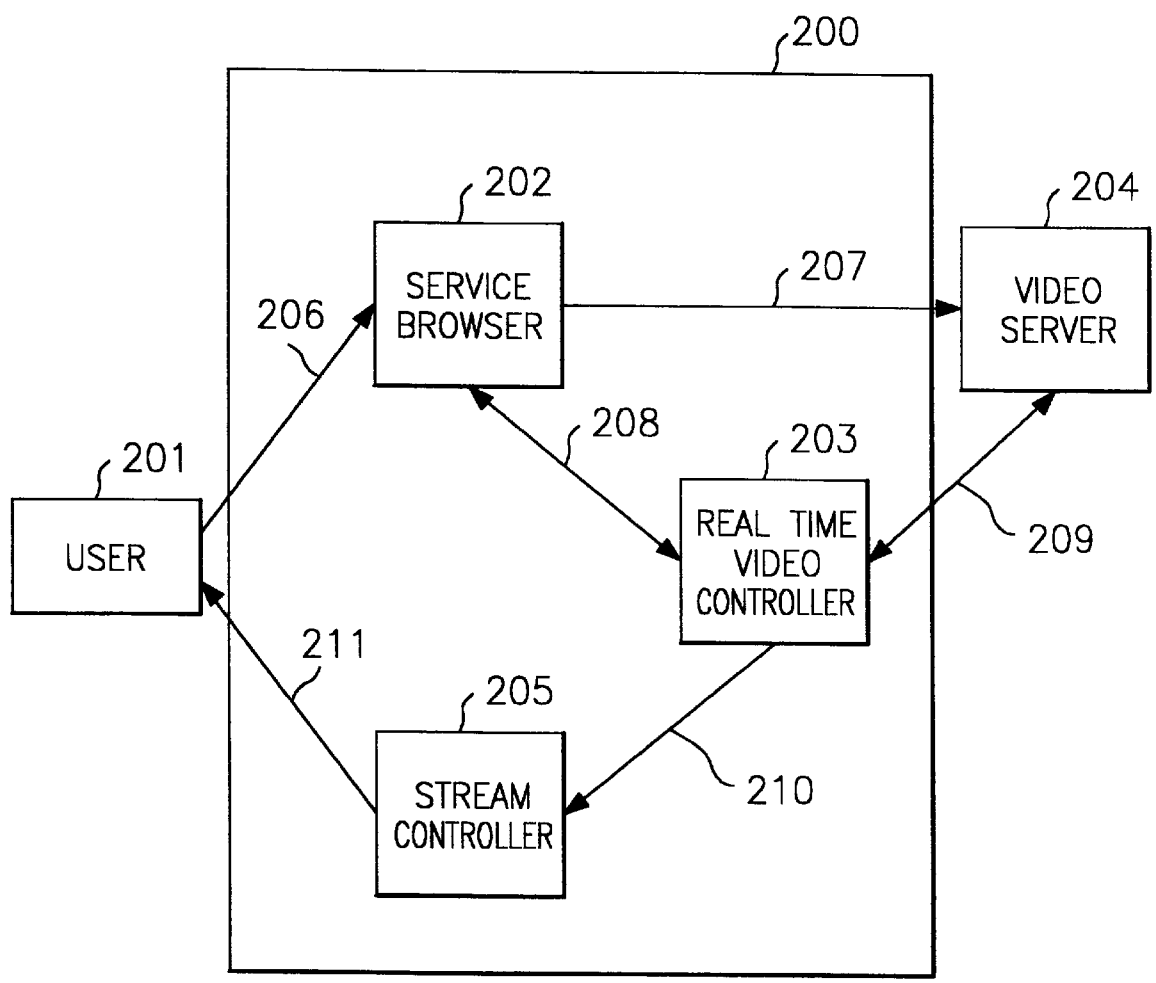
FIG. 2 is a view illustrating a mediate server according to the present invention.

FIG. 2 is a view illustrating a mediate server according to the present invention.

In the drawings, reference numeral 200 denotes a mediate server, 201 denotes a user, 202 denotes a service browser, 203 is a real time video controller, 204 is a video server, and 205 denotes a stream controller.

The user 201 is a user of the high speed local network 100. The video server 204 is a video server of the high speed local network 100 or the low speed Internet network 101. The service browser 202 is an HTTP server function with which the user can browse or select a desired service by using the interface 206. When selecting the service, in the case that the video server which provides the service is in the high speed local network 100, the service browser 202 is connected to the video server 204 through the interface 207. In the case that the video server in the low speed Internet network 101, the service is provided by the real time video controller 203. Here, the server address, service format, and selection subject, etc. are provided through the interface 208.

The real time video controller 203 determines the buffer size after measuring a traffic through the interface 209 with the video server 204, allots the buffer as much as a corresponding size, and requests the data to the video server 204. The received data is transferred to the stream controller 205 through the interface 210. When the stream controller 205 receives a minimum data enough for displaying the video data selected by the user, the stream protocol is used, in order for the user not to wait longer time. The stream protocol is a server function of the mediate server 200. The stream protocol is implemented as a user function of the user 201. The video stream is transferred at a proper speed through the interface 211.

Figure 3:
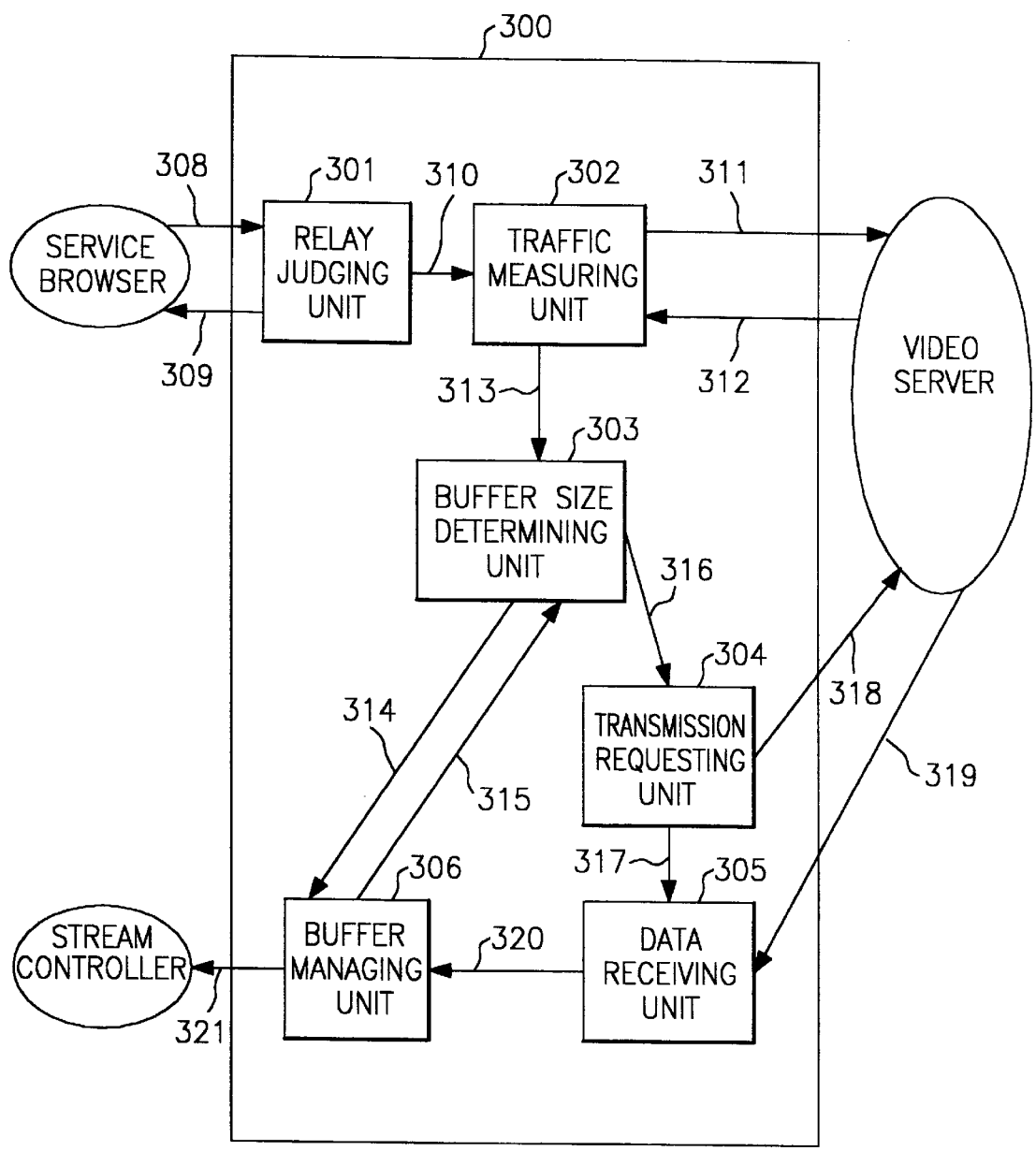
FIG. 3 is a view illustrating the construction of a real time video control apparatus according to the present invention.

FIG. 3 is a view illustrating the construction of a real time video control apparatus according to the present invention.

In the drawings, reference numeral 301 denotes a mediate judging unit, 302 denotes a traffic measuring unit, 303 denotes a buffer size determining unit, 304 denotes a transmission requesting unit, 305 denotes a data receiving unit, and 306 denotes a buffer managing unit.

The mediate judging unit 301 performs a function of judging whether the requested service requires a mediate function. The service browser 202 is directed top transferring the server address, service type, and selection subject for judging whether a mediation is performed through the interface 308.

The mediate judging unit 301 judges whether the relay function is necessary based on the location of the network and the type of the service through the service location by using the server address. In the case that the mediate function is not needed, it is informed that the mediate function is not needed through the interface 309. In the case that the mediate function is not needed, the service browser 202 is directly connected to the video server 204, for thus providing the service. In the case that the mediate function is needed, the address information of the corresponding video server is transmitted to the traffic measuring unit 302. The traffic measuring unit 302 measures for a predetermined time in a state the traffic measuring unit 302 is connected to the video server, and a measured result is used as a factor for determining the size of the local buffer. The traffic measuring method may be properly used based on the corresponding condition by maintaining a serviced data. Namely, the service use information such as what date, service connection duration, etc. may be stored. Another method is directed to measuring the traffic by connecting with the video server which was dynamically selected. This method is directed to simply using the existing application such as "ping", and "ftp". In the present invention, the dynamic method was used.

The traffic result measured by the traffic measuring unit 302 is transmitted to the buffer size determination unit 303 through the interface 313, and the buffer size determination unit 303 determines the size of the buffer by using the service request bandwidth and the size of the selected file in accordance with the measured traffic and the service type. Since the bandwidth based on the service type is the maximum 2 Mbps in the case of the MPEG-I, and is the maximum 20 Mbps in the case of the MPEG-II, the maximum width with respect to each service must be previously obtained for using as buffer determination factors. The method for computing the buffer size by using the thusly obtained factors is performed as follows:

The size of the buffer=(the video file size*(the service request bandwidth−the traffic with the measured server)/the service request bandwidth)

The buffer size determination unit 303 which determined the buffer size requests a buffer allocation to the buffer management unit 306 through the interface 314.

The buffer management unit 306 allocates the buffer by using the received parameters. Since the video data is being received by the packet unit, the allocation is performed by 10% more than the size which is previously determined when allocating the buffer. The buffer management unit 306 which allocated the buffer informs the allocation completion state and the allocated buffer identifier to the buffer size determination unit 303 through the interface 315.

The buffer size determination unit 303 transmits the server address, the service subject, and the buffer identifier to the transmission request unit 304 through the interface 316. The transmission request unit 304 requests a data transmission to the video server through the interface 318. The server address information with respect to the data to be received is transferred to the data receiving unit 305 through the interface 317. The data receiving unit 305 transfers the data received together with the buffer identifier allocated by the buffer managing unit 306 to the buffer managing unit 306 through the interface 320 when the data is received to the video server through the interface 319 in the receiving ready state. The buffer managing unit 306 writes the data into the allocated buffer, judges the error state of the corresponding buffer, compares the buffer size with the received data size, and determined whether a result of the comparison is transmitted to the user. If the size of the received data exceeds the buffer size, it is informed to the stream controller 205 that the data is received to a predetermined server through the interface 321. The user waits until the buffer is filled with data based on the service speed on the Internet, for thus receiving real time video service.

Figure 4:
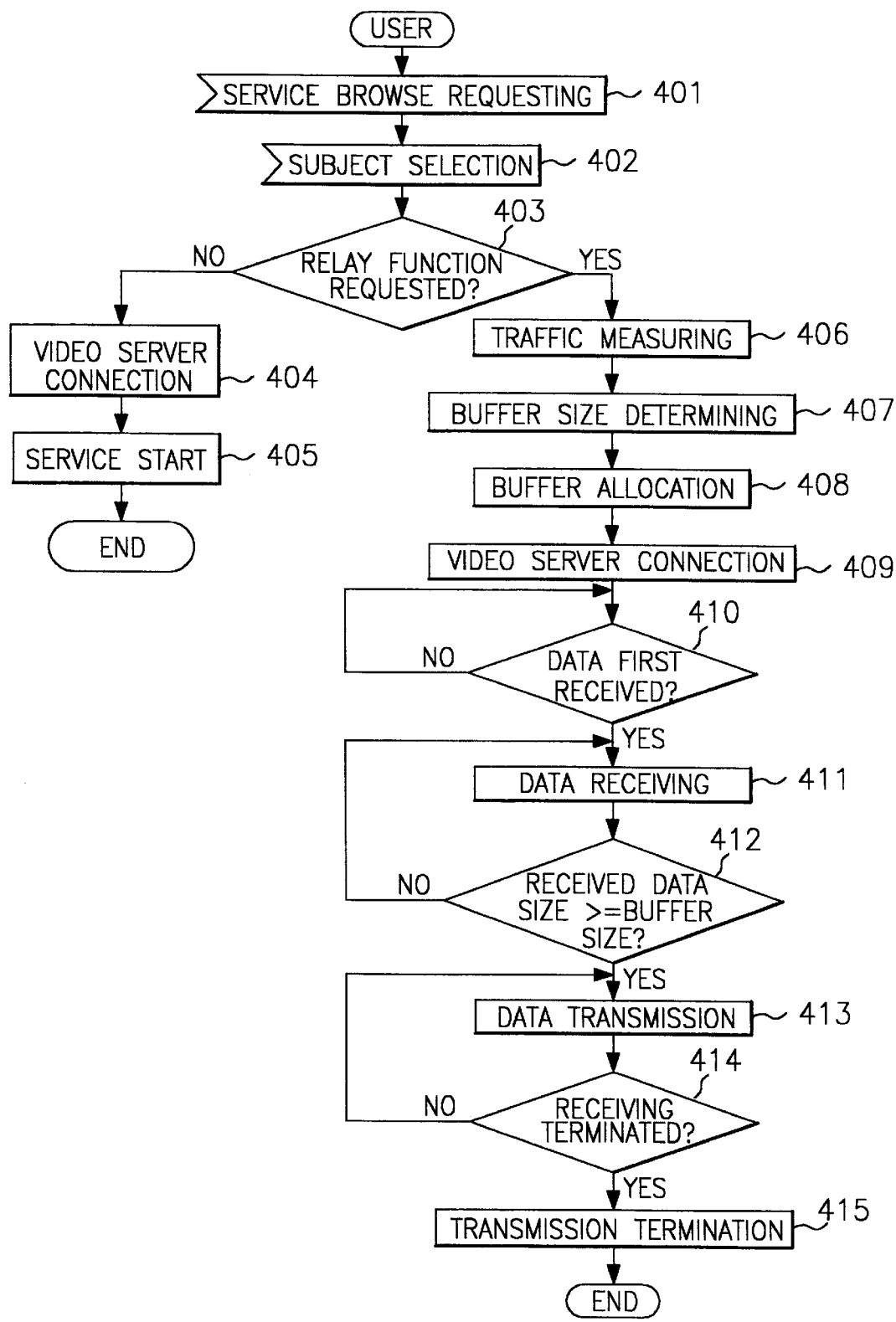
FIG. 4 is a flow chart of a real time video delivery method according to the present invention.

FIG. 4 is a flow chart of a real time video delivery method according to the present invention.

A service browsing is requested by a user in step 401. When receiving a subject which was selected by the user in step 402, it is judged whether the mediate function is not needed in step 403. As a result of the judgement, in the case that the mediate function is not necessary, the service browser 202 is directly connected to the server 204 in step 404, and the video service is provided, and the routine is terminated in step 405.

As a result of the judgement, if the mediate function is needed, the traffic with the video server is measured for determining the buffer size which is necessary for the real time video service in step 406. Thereafter, the buffer size is determined based on the service dependent request bandwidth, the measured traffic, and the selected video file size in accordance with the service type provided from the service browser 202 in step 407. After the buffer is allocated based on the determined buffer size in step 408, it is connected with the video server, and the data is requested in step 409.

If the data is received in step 410, and if the data is received enough as much as the buffer size in steps 411 and 412, the data is transmitted to the user through the stream controller 205 in step 413. Thereafter, the data receiving and transmission is performed in parallel, and the above-described routine is performed until the data receiving of the selected subject is terminated, and the data is transmitted to the user in steps 414 and 415.

Figure 5A:
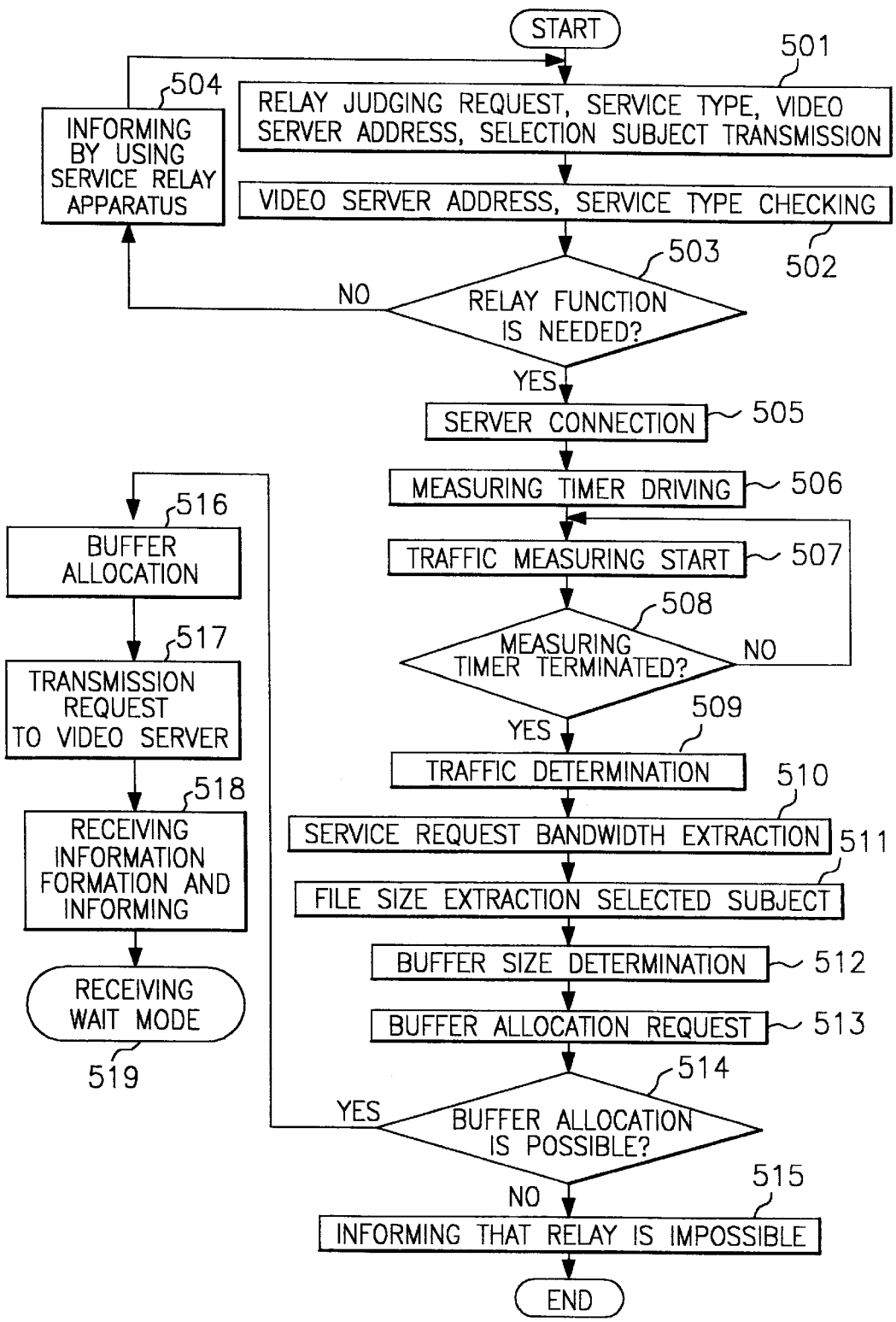
FIGS. 5A and 5B are flow charts of a real time video control method according to the present invention.
Figure 5B:
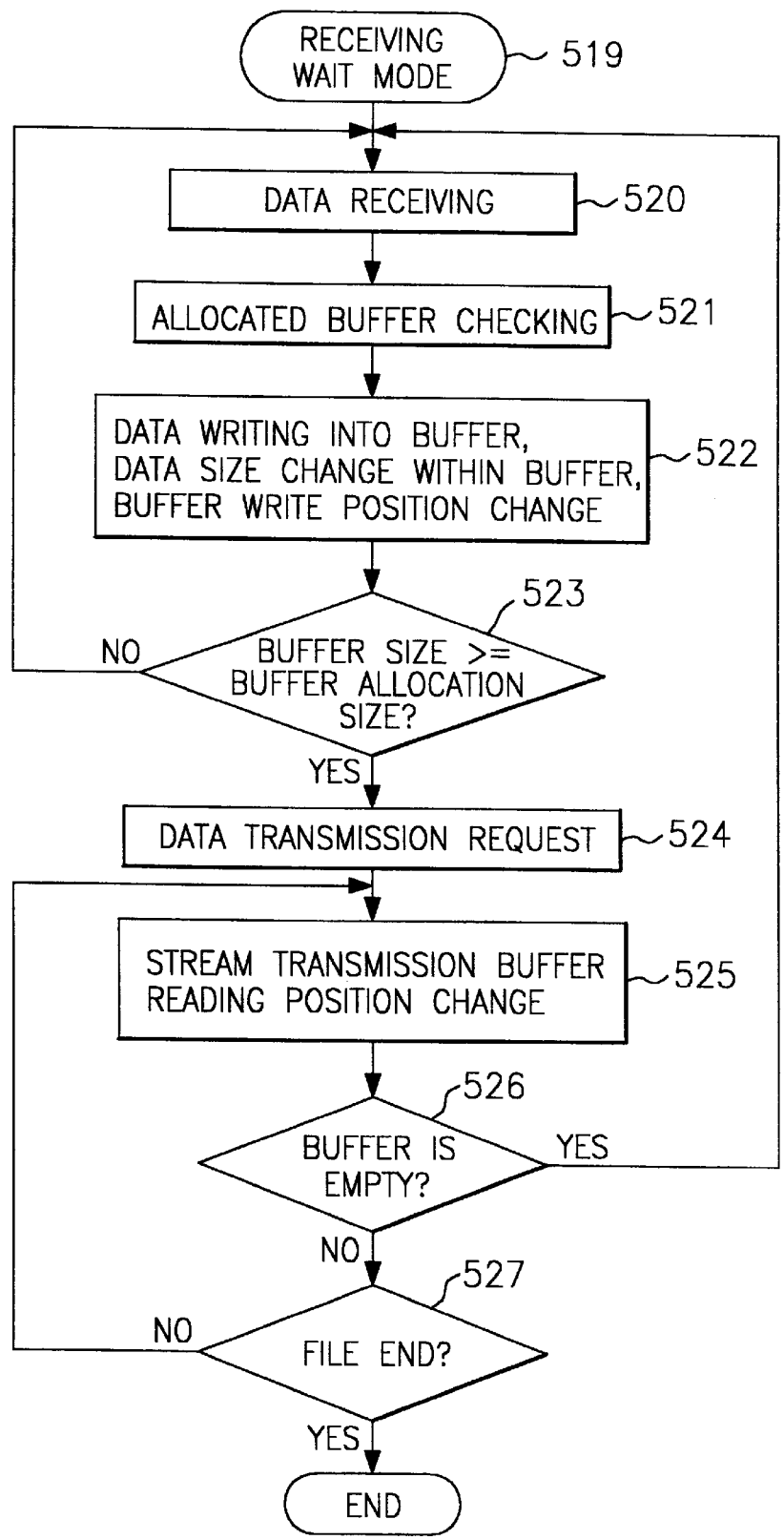

FIGS. 5A and 5B are flow charts of a real time video control method according to the present invention.

As shown therein, if a mediate function judging request is received from the service browser 202 together with the video server address, the selection subject in step 501, the service type is checked among the parameters transferred for extracting the service request bandwidth, and the position of the network server is judged, and the video server address is checked for judging whether the bandwidth which is requested by the user is available in step 502. Thereafter, it is determined whether the mediate function is needed by using the parameters transferred together with the request commands.

If the mediate function is not needed, it is informed to the service browser 202 that the mediate function is not needed in step 504.

If the mediate function is needed, a connection with the video server is attempted for determining the traffic with the video server in step 505. The traffic is measured in steps 507 and 508 until the measuring timer is terminated by driving the measuring timer 506. Since the measuring time of the measuring timer is varied in the case of the Ethernet in which the video server is connected through the public network, the measured time is set enough for measuring the minimum traffic.

The traffic condition is determined by using the minimum value among the traffic measured during the measuring time of the measuring timer in step 509, and the service request bandwidth is extracted in step 510 in accordance with the service type provided from the service browser 202, and the file size of the selected subject is extracted in step 511, and the buffer size is determined based on the measuring traffic, the service request bandwidth, and the size of the selected file in step 512.

The buffer allocation is requested to the buffer managing unit 306 in accordance with the determined buffer size in step 514, and if it is impossible to allocate the buffer since there is not a remaining buffer due to many users, it is informed that the mediate function is not available, and the routine is terminated in step 515. Here, the termination times of other users are predicted based on the services which are being provided, and it is informed to the user that the mediate function is possible after a predetermined time. If the buffer allocation is possible, the buffer managing unit 306 allocates the buffer in step 516. Here, the allocated buffer receives an identifier. Each identifier is related to the server address, and the selected subject, for thus judging the received data.

The transmission request unit 304 which received the allocated buffer requests the video server to transmit the data of the selected subject in step 517. In addition, the receiving information related to the server address, the selection subject, and the buffer identifier is informed to the data receiving unit 305 for receiving the data from the video server in step 518, and the routine waits until the data is received from the video server in step 519.

In the receiving waiting state, if the data of the selected subject is received from the requested video server in step 520, the allocation buffer is checked through the identifier of the related buffer in step 521. Thereafter, the data is written into the buffer allocated, and the writing position which is used for each buffer is changed, and the size of the data written into the buffer is changed in step 522. Thereafter, it is judged whether the received data is greater than or equal to the buffer size allocated in step 523. If the received data is less than the buffer size allocated, the process is repeated from the receiving process of step 520 until the above-described condition is satisfied, and if the received data is equal thereto, the result is informed to the buffer managing unit 306, and requests the stream controller 205 to transmit the data in step 524. The reading position of the buffer is changed, and the data is transmitted to the stream transmission controller 205 in step 525. Here, if the transmission speed to the stream controller 205 is faster than the receiving speed from the video server, namely, if there is not data in the buffer, an underflow may occur. In this case, the routine becomes a ready mode until the data as much as the buffer size are received, and then the receiving is performed. The buffer is performed in a circular queue method, and the reading/writing information is changed based thereon.

Thereafter, it is judged whether the buffer is empty in step 526. If there are not data in the buffer, the routine is repeated from the receiving process of step 520. If there are data in the buffer, it is judged that it is reference to the end of the file in step 527. If it is not the end of the file, the routine is repeated from the stream transmission process of step 525, and if it is referred to the end of the file, the routine is terminated.

The data receiving process from the video server and the data transmission process to the stream controller 205 are performed in parallel. Each process is terminated based on the receiving completion operation and the transmission completion operation. The judgement reference is performed by judging the end of the data file.

As described above, the mediate server and real time delivery method between different networks according to the present invention is basically directed to receiving various video services on the low speed Internet in real time after a predetermined time. In addition, the various video services can be received based on the service reserving system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A mediate server for providing a real time video service between different networks having different network speeds, comprising:

a service browsing means directly connected to a high speed network server for transferring a server address, service type, and selection is received from the user, receiving a result whether a mediate function is needed, and providing a service;

a real time control means for transferring a result to the service browsing means when there is not a mediate function by judging whether the mediate function is needed by receiving a server address, service type, and selection list from the service browsing means, determining the buffer size after measuring a traffic based on the connection to the server when the mediate function is needed, allocating the buffer, requesting the data to the server, and receiving/transferring the data; and a stream control means for transferring to the user by using the stream protocol when receiving a minimum data from the real time control means;

wherein said buffer size determination means is directed to determining the buffer size by the equation wherein the size of the buffer=the video file size*(the service request bandwidth−the traffic with the measured server)/the service request bandwidth.

2. The mediate server between different networks of claim 1, wherein said buffer managing means is directed to allocating the buffer by 10% more than the buffer size requested by the buffer size determination means since the video data is received by the packet unit.

3. A real time delivery method between different networks, comprising the steps of:

a first step for judging whether a mediate function is needed when a service browsing is requested by a user, and a selection list is received;

a second step for providing a real time video service after being connected with a server when the mediate function is not needed as a result of the first step; and a third step for measuring a traffic with the server when the mediate function is needed as a result of the first step, determining the buffer size in accordance with a service dependent bandwidth, measuring traffic, and selection list file size, allocating the buffer, requesting a data to the server, and transferring a data to the user through a stream controller when the data as much as the buffer size is received;

wherein said third step includes the steps of:

a fourth step for judging whether a mediate function is needed after checking the service type and the video server address when receiving a mediate function judgement request together with the service type, the server address, and the selection list from the service browser;

a fifth step for informing to the service browser that the mediate function is not needed in the case that the mediate function is not needed as a result of the fourth step, and driving a measuring timer after being connected to the server when the mediate function is needed, and measuring the traffic until the measuring timer is stopped;

a sixth step for setting a traffic environment as a minimum value among the measured traffics, extracting the service request bandwidth in accordance with the service type from the service browser, extracting the file size of the selected list, and determining the buffer size in accordance with the measuring traffic, service request bandwidth, and selected list file size;

a seventh step for checking whether the buffer allocation function is available based on the determined buffer size, informing that the mediation is not available when the buffer allocation is impossible, allocating the buffer by providing a buffer identifier when the buffer allocation is possible, requesting the data of the selected list to the server by using the server address, and informing the receiving information of the server address, the selection list, and the buffer identifier to the receiving unit for receiving the data from the server;

an eighth step for checking the allocated buffer through the buffer identifier then the data of the list selected by the server which is transmission-requested, writing the received data into the allocated buffer, changing the writing position of each buffer, receiving the data until the received data is greater than or equal to the buffer size, and requesting the data transmission to the stream controller; and a ninth step for changing the reading position of the buffer in accordance with the data transmission request, transmitting the data to the stream transmission, judging whether the buffer is empty, repeating the routine from the receiving process of the eighth step when there is not a data in the buffer, judging whether it is referred to the end of the file when there is a data in the buffer, repeating the routine from the stream transmission process when it is not referred to the end of the file, and terminating the routine when it is referred to the end of the file.

4. The real time delivery method between different networks of claim 3, wherein said seventh step includes a step for predicting a termination time during the service and informing the service is available after a predetermined time.

5. The real time delivery method between different networks of claim 3, wherein said buffer is operated in a circular queue method.

* * * * *